(12) United States Patent
Sajassi et al.

(10) Patent No.: US 8,531,941 B2
(45) Date of Patent: Sep. 10, 2013

(54) INTRA-DOMAIN AND INTER-DOMAIN BRIDGING OVER MPLS USING MAC DISTRIBUTION VIA BORDER GATEWAY PROTOCOL

(75) Inventors: Ali Sajassi, San Ramon, CA (US); Keyur Patel, San Jose, CA (US); Chandrashekhar Appanna, Cupertino, CA (US); Stefano Previdi, Rome, IA (US)

(73) Assignee: Cisco Technology, Inc., San Jose, CA (US)

( * ) Notice: Subject to any disclaimer, the term of this patent is extended or adjusted under 35 U.S.C. 154(b) by 703 days.

(21) Appl. No.: 11/827,772

(22) Filed: Jul. 13, 2007

(65) Prior Publication Data

US 2009/0016365 A1 Jan. 15, 2009

(51) Int. Cl.
*H04L 12/28* (2006.01)
(52) U.S. Cl.
USPC ............ 370/219; 370/235; 370/256; 370/389
(58) Field of Classification Search
USPC ................. 370/255, 256, 392, 401, 219, 235, 370/389
See application file for complete search history.

(56) References Cited

U.S. PATENT DOCUMENTS

| | | | |
|---|---|---|---|
| 5,331,637 A | 7/1994 | Francis et al. | |
| 5,818,842 A | 10/1998 | Burwell et al. | |
| 5,848,227 A | 12/1998 | Sheu | |
| 6,055,364 A | 4/2000 | Speakman et al. | |
| 6,073,176 A | 6/2000 | Baindur et al. | |
| 6,078,590 A | 6/2000 | Farinacci et al. | |
| 6,188,694 B1 | 2/2001 | Fine et al. | |
| 6,301,244 B1 | 10/2001 | Huang et al. | |
| 6,304,575 B1 | 10/2001 | Carroll et al. | |
| 6,308,282 B1 | 10/2001 | Huang | |
| 6,373,838 B1 | 4/2002 | Law et al. | |
| 6,424,657 B1 | 7/2002 | Voit et al. | |
| 6,430,621 B1 | 8/2002 | Srikanth et al. | |
| 6,484,209 B1 | 11/2002 | Momirov | |
| 6,502,140 B1 | 12/2002 | Boivie | |
| 6,519,231 B1 | 2/2003 | Ding et al. | |
| 6,611,869 B1 | 8/2003 | Eschelbeck et al. | |
| 6,665,273 B1 | 12/2003 | Goguen et al. | |
| 6,667,982 B2 | 12/2003 | Christie et al. | |
| 6,668,282 B1 | 12/2003 | Booth, III et al. | |

(Continued)

OTHER PUBLICATIONS

Chiruvolu et al., "Issues and Approaches on Extending Ethernet Beyond LANs", IEEE Communications Magazine, Mar. 2004, p. 80-86.*

(Continued)

*Primary Examiner* — Brian O'Connor
(74) *Attorney, Agent, or Firm* — Baker Botts L.L.P.

(57) ABSTRACT

In one embodiment, a method includes receiving, by a first autonomous system border router (ASBR) of a first autonomous system (AS), a first plurality of provider-provisioned media access control (B-MAC) addresses via Interior Border Gateway Protocol (I-BGP). Each of first plurality of B-MAC addresses is associated with a provider edge (PE) device of the first AS. The first ASBR sends the first plurality of B-MAC addresses to a second ASBR of a second AS using Exterior Border Gateway Protocol (E-BGP). The first ASBR also receives via E-BGP a second plurality of B-MAC addresses each of which is associated with a PE device of the second AS. The first ASBR then distributes the second plurality of B-MAC addresses to each of the PE devices of the first AS using I-BGP.

20 Claims, 5 Drawing Sheets

(56) References Cited

U.S. PATENT DOCUMENTS

| | | | |
|---|---|---|---|
| 6,693,878 B1 | 2/2004 | Daruwalla et al. | |
| 6,732,189 B1 | 5/2004 | Novaes | |
| 6,757,286 B1 | 6/2004 | Stone | |
| 6,763,469 B1 | 7/2004 | Daniely | |
| 6,785,232 B1 | 8/2004 | Kotser et al. | |
| 6,785,265 B2 | 8/2004 | White et al. | |
| 6,789,121 B2 | 9/2004 | Lamberton et al. | |
| 6,798,775 B1 | 9/2004 | Bordonaro | |
| 6,801,533 B1 | 10/2004 | Barkley | |
| 6,813,268 B1 | 11/2004 | Kalkunte et al. | |
| 6,826,698 B1 | 11/2004 | Minkin et al. | |
| 6,829,252 B1 | 12/2004 | Lewin et al. | |
| 6,839,348 B2 | 1/2005 | Tang et al. | |
| 6,850,521 B1 | 2/2005 | Kadambi et al. | |
| 6,850,542 B2 | 2/2005 | Tzeng | |
| 6,852,542 B2 | 2/2005 | Mandel et al. | |
| 6,879,594 B1 | 4/2005 | Lee et al. | |
| 6,882,643 B1 | 4/2005 | Mauger et al. | |
| 6,892,309 B2 | 5/2005 | Richmond et al. | |
| 6,901,048 B1* | 5/2005 | Wang et al. | 370/228 |
| 6,954,436 B1 | 10/2005 | Yip | |
| 7,009,983 B2 | 3/2006 | Mancour | |
| 7,016,351 B1 | 3/2006 | Farinacci et al. | |
| 7,082,140 B1* | 7/2006 | Hass | 370/466 |
| 7,092,389 B2 | 8/2006 | Chase et al. | |
| 7,113,512 B1 | 9/2006 | Holmgren et al. | |
| 7,116,665 B2 | 10/2006 | Balay et al. | |
| 7,173,934 B2 | 2/2007 | Lapuh et al. | |
| 7,269,132 B1* | 9/2007 | Casey et al. | 370/219 |
| 7,277,936 B2 | 10/2007 | Frietsch | |
| 7,310,342 B2 | 12/2007 | Rouleau | |
| 7,345,991 B1 | 3/2008 | Shabtay et al. | |
| 7,394,756 B1* | 7/2008 | Cook | 370/216 |
| 7,408,936 B2 | 8/2008 | Ge et al. | |
| 7,408,941 B2* | 8/2008 | Martini et al. | 370/395.53 |
| 7,433,963 B2* | 10/2008 | Anschutz | 709/236 |
| 7,447,207 B2* | 11/2008 | Shankar | 370/392 |
| 7,466,703 B1 | 12/2008 | Arunachalam et al. | |
| 7,487,236 B2* | 2/2009 | Zabihi et al. | 709/223 |
| 7,599,360 B2* | 10/2009 | Edsall et al. | 370/389 |
| 7,660,303 B2* | 2/2010 | Solomon et al. | 370/389 |
| 7,688,756 B2* | 3/2010 | Allan et al. | 370/254 |
| 7,693,164 B1* | 4/2010 | Busch et al. | 370/401 |
| 7,746,892 B2* | 6/2010 | Mohan et al. | 370/466 |
| 7,756,022 B1* | 7/2010 | Cook | 370/229 |
| 7,872,991 B2* | 1/2011 | Chu et al. | 370/256 |
| 7,974,308 B2* | 7/2011 | White et al. | 370/466 |
| 2002/0032780 A1 | 3/2002 | Moore et al. | |
| 2002/0087721 A1 | 7/2002 | Sato et al. | |
| 2002/0156612 A1 | 10/2002 | Schulter et al. | |
| 2002/0196795 A1 | 12/2002 | Higashiyama | |
| 2003/0012183 A1 | 1/2003 | Butler | |
| 2003/0036375 A1 | 2/2003 | Chen et al. | |
| 2003/0101243 A1 | 5/2003 | Donahue et al. | |
| 2003/0110268 A1 | 6/2003 | Kermarec et al. | |
| 2003/0112781 A1 | 6/2003 | Kermode et al. | |
| 2003/0142674 A1 | 7/2003 | Casey | |
| 2003/0154259 A1 | 8/2003 | Lamberton et al. | |
| 2003/0177221 A1 | 9/2003 | Ould-Brahim et al. | |
| 2004/0095940 A1 | 5/2004 | Yuan et al. | |
| 2004/0102182 A1 | 5/2004 | Reith et al. | |
| 2004/0107382 A1 | 6/2004 | Doverspike et al. | |
| 2004/0125809 A1 | 7/2004 | Jeng | |
| 2004/0133619 A1 | 7/2004 | Zelig et al. | |
| 2004/0141501 A1 | 7/2004 | Adams et al. | |
| 2004/0151180 A1 | 8/2004 | Hu et al. | |
| 2004/0158735 A1 | 8/2004 | Roese | |
| 2004/0165525 A1 | 8/2004 | Burak | |
| 2004/0165600 A1 | 8/2004 | Lee | |
| 2004/0172559 A1 | 9/2004 | Luo et al. | |
| 2004/0196843 A1* | 10/2004 | Zinin | 370/389 |
| 2004/0228291 A1 | 11/2004 | Huslak et al. | |
| 2004/0233891 A1 | 11/2004 | Regan | |
| 2004/0264364 A1 | 12/2004 | Sato | |
| 2005/0007951 A1 | 1/2005 | Lapuh et al. | |
| 2005/0013295 A1* | 1/2005 | Regan et al. | 370/389 |
| 2005/0025143 A1 | 2/2005 | Chen et al. | |
| 2005/0030975 A1 | 2/2005 | Wright et al. | |
| 2005/0044265 A1 | 2/2005 | Vinel et al. | |
| 2005/0063381 A1* | 3/2005 | Kayalackakom et al. | 370/389 |
| 2005/0063397 A1 | 3/2005 | Wu et al. | |
| 2005/0068972 A1 | 3/2005 | Burns et al. | |
| 2005/0089047 A1 | 4/2005 | Ould-Brahim et al. | |
| 2005/0099949 A1 | 5/2005 | Mohan et al. | |
| 2005/0152370 A1 | 7/2005 | Meehan et al. | |
| 2005/0157664 A1 | 7/2005 | Baum | |
| 2005/0157751 A1 | 7/2005 | Rabie et al. | |
| 2005/0163049 A1 | 7/2005 | Yazaki et al. | |
| 2005/0175022 A1 | 8/2005 | Nishimura et al. | |
| 2005/0190773 A1 | 9/2005 | Yang et al. | |
| 2005/0239445 A1 | 10/2005 | Karaoguz et al. | |
| 2005/0249124 A1 | 11/2005 | Elie-Dit-Cosaque et al. | |
| 2005/0286503 A1 | 12/2005 | Oda et al. | |
| 2006/0007867 A1 | 1/2006 | Elie-Dit-Cosaque et al. | |
| 2006/0092847 A1 | 5/2006 | Mohan et al. | |
| 2006/0098607 A1 | 5/2006 | Zeng | |
| 2006/0120288 A1* | 6/2006 | Vasseur et al. | 370/235 |
| 2006/0126496 A1* | 6/2006 | Filsfils et al. | 370/216 |
| 2006/0182037 A1 | 8/2006 | Chen et al. | |
| 2006/0198323 A1* | 9/2006 | Finn | 370/256 |
| 2006/0248277 A1 | 11/2006 | Pande | |
| 2006/0285500 A1 | 12/2006 | Booth | |
| 2006/0285511 A1 | 12/2006 | Damm | |
| 2006/0291445 A1* | 12/2006 | Martini et al. | 370/351 |
| 2007/0076719 A1* | 4/2007 | Allan et al. | 370/392 |

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

* cited by examiner

INTRA-DOMAIN AND INTER-DOMAIN BRIDGING OVER MPLS USING MAC DISTRIBUTION VIA BORDER GATEWAY PROTOCOL

TECHNICAL FIELD

This disclosure relates generally to the field of digital computer networks; more particularly, to switching of data packets both in an autonomous system (AS) and between autonomous systems.

BACKGROUND

A LAN is a high-speed network that supports many computers connected over a limited distance (e.g., under a few hundred meters). A Virtual Local Area Network (VLAN) is mechanism by which a group of devices on one or more LANs is configured using management software so that they can communicate as if they were attached to the same LAN, when in fact they are located on a number of different LAN segments. Since VLANs commonly span many switches across different LAN segments, sharing of Virtual LANs by a common set of infrastructure switches is achieved by inserting a VLAN identifier (VID) or tag into the Ethernet frame header to provide differentiation between traffic flow, i.e., separate service or customer instance. The customer identifier is frequently referred to as the service instance identifier since it identifies the service provided for a particular customer. A Virtual Private LAN Service (VPLS) service emulates a VLAN over an MPLS/IP network allowing the sites for a given VLAN to be geographically dispersed. If these sites are located in different Administrative System domains (ASes), then Multi-Protocol Border Gateway Protocol (MP-BGP) is used for communication across these domains for an MPLS/IP network.

Currently, bridged services for Metro Ethernet networks (ELAN or EVLAN) are offered over MPLS using an overlay topology where Provider Edge devices (PEs) are connected using pseudowires (PWs). A PW is a virtual connection between two PE devices. In the context of the VPLS service, a PW can be thought of as point-to-point virtual link for each service offered between a pair of Virtual Switch Instances (VSIs) within the PEs that emulates an Ethernet Virtual LAN function in terms of media access control (MAC) address learning and forwarding. Each VSI can be thought of as a virtual Ethernet switch for a given customer service instance, and each PW can be thought of as a virtual link connecting these virtual switches over a Packet Switched Network.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the present invention. However, persons having ordinary skill in the relevant arts will appreciate that these specific details may not be needed to practice the embodiments described.

In the context of the present application, a computer network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

A customer equipment or customer edge (CE) device, as those terms are used in the present disclosure, refers to a customer node or device that connects to the service provider. A provider edge (PE) device refers to a device or node that is used to connect CE devices to the service provider network. A PE device is typically associated with a provider core or backbone network. A PE may connect directly with one or more CEs (or with other PE devices) associated with a service provider access network. A PE device capable of a bridging function can provide Virtual LAN service to the CE devices as if they are connected to a LAN segment. A hierarchical network typically consists of access networks and core networks with user-facing PE devices (u-PEs) at the edge of the access network and network-facing PE devices (n-PEs) at the edge of their core network.

In the context of the present application, an autonomous system border router (ASBR) is a service provider device that redistributes routes from one Autonomous System (AS) or domain into another one. This functionality can be implemented within an n-PE or it can be in a different device. The Border Gateway Protocol (BGP) is a system routing protocol used to exchange routing information for the Internet and is commonly used between Internet service providers (ISPs). ISPs typically use BGP to exchange customer and ISP routes. When BGP is used between autonomous systems (ASes), the protocol is referred to as External BGP (E-BGP). If a service provider is using BGP to exchange routes within an AS, then the protocol is referred to as Interior BGP (I-BGP). Routes learned via BGP have associated properties or attributes that are used to determine the best route to a destination when multiple paths exist to a particular destination.

In one embodiment, a method is provided that includes the steps of learning, by a PE device of an AS, MAC addresses of a plurality of other PE devices of the AS. The learning is performed as a control plane function with the MAC addresses being stored in a table. The PE device then receives a packet data unit (PDU) encapsulated in a frame, with the frame including a MAC destination address. The PE device then performs a lookup in the table to determine a port associated with the MAC destination address.

According to another embodiment of the present invention, I-BGP is utilized to distribute provider-provisioned backbone MAC (B-MAC) addresses among different PE devices within a single autonomous system (AS). In another embodiment, E-BGP protocol is also used to distribute B-MAC addresses among different ASes. All learning of B-MAC addresses among the PEs—whether in intra-AS or inter-AS—is performed in the control plane. That is, no learning is performed in the data plane, thereby obviating the need for pseudowires. In one implementation the extended community attribute, which provides a way of grouping destinations, i.e., communities, to which routing decisions (such as acceptance, preference, and redistribution) can be applied, is utilized to pass B-MAC addresses during control plane learning.

In a specific embodiment, customer MAC (C-MAC) addresses are learned in the data plane by the u-PE devices. Each of the u-PE devices encapsulates C-MAC addresses with B-MAC addresses using IEEE 802.1ah encapsulation. These B-MAC addresses are distributed using I-BGP among PEs within an AS, and using E-BGP between different ASes. The extended community attribute is utilized by the E-BGP to pass B-MAC updates from one autonomous system border router (ASBR) (associated with one AS) into an ASBR associated with a different AS.

Figure 1:
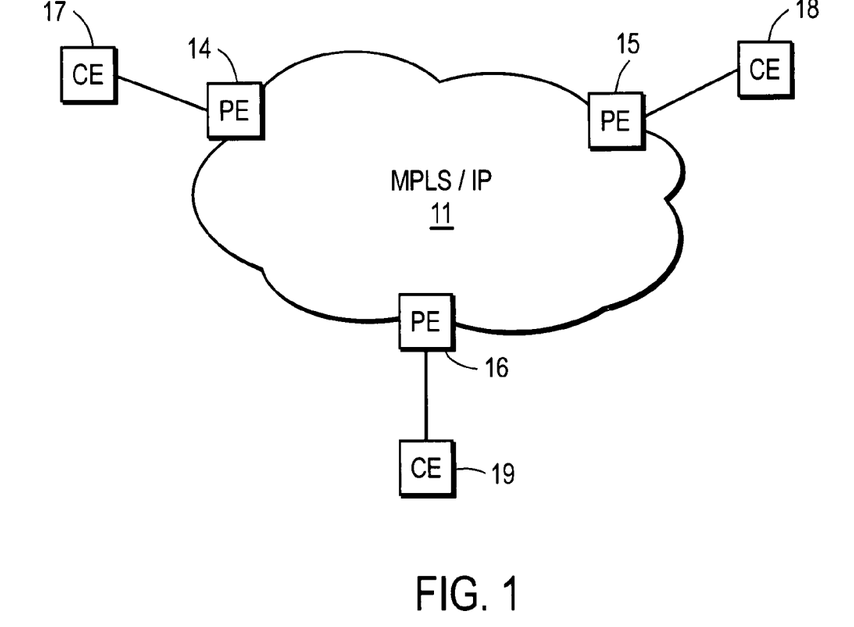
FIG. 1 illustrates an example packet-based network that includes a MPLS/IP provider backbone or core network.

FIG. 1 illustrates an example packet-based network 10 that includes a MPLS/IP provider backbone or core network 11. Provider edge (PE) devices 14-16 are shown distributed about backbone network 11. Each of PE devices 14-16 are respectively shown connected to customer edge (CE) devices 17-19. Thus, the example of FIG. 1 is that of a single autonomous system (AS). In the embodiment shown, B-MAC address learning is performed in the control plane using BGP, thereby obviating use of pseudowires. This paradigm facilitates so-called "MAC-in-MAC" encapsulation where frames are first encapsulated and then transmitted to destination addresses (PEs) via ordinary MPLS tunneling without pseudowires. To achieve this functionality, each of PE devices 14-16 includes software (or firmware) plug-ins, modules, or enhancements that implement the various features and functions described herein.

Figure 2:
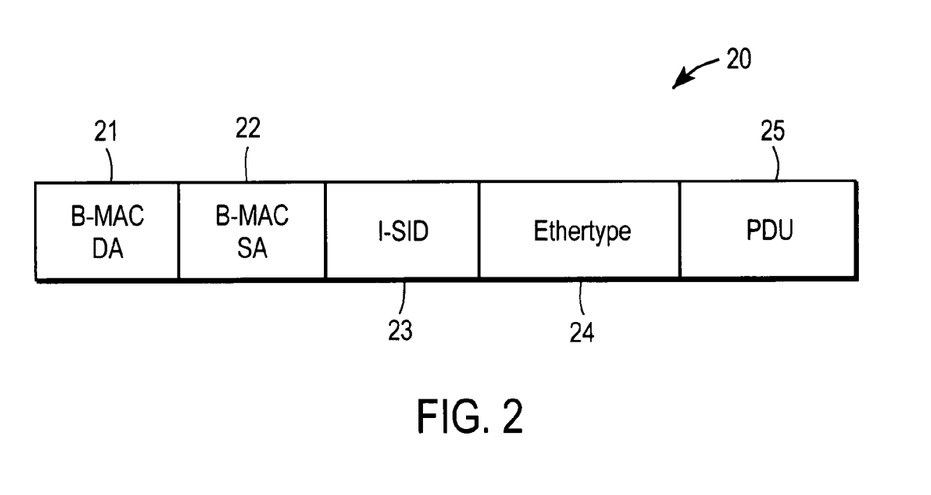
FIG. 2 illustrates an example Ethernet frame format for data packet transmission over the backbone network shown in FIG. 1.

FIG. 2 illustrates an example Ethernet frame format for data packet transmission over the backbone network shown in FIG. 1. Frame 20 includes a provider-provisioned B-MAC destination address (B-MAC DA) bit field 21, a provider-provisioned B-MAC source address (B-MAC SA) bit field 32, a service instance identifier (I-SID) field 23 associated with a particular customer (I-SID field 23 defines the service instance that the frame should be mapped to), an Ethertype field 24 (an Ethertype is a field in the Ethernet networking standard that is used to indicate which protocol is being transported on an Ethernet frame), and finally, the packet data unit (PDU) field 25, which contains the payload of the frame.

Figure 3:
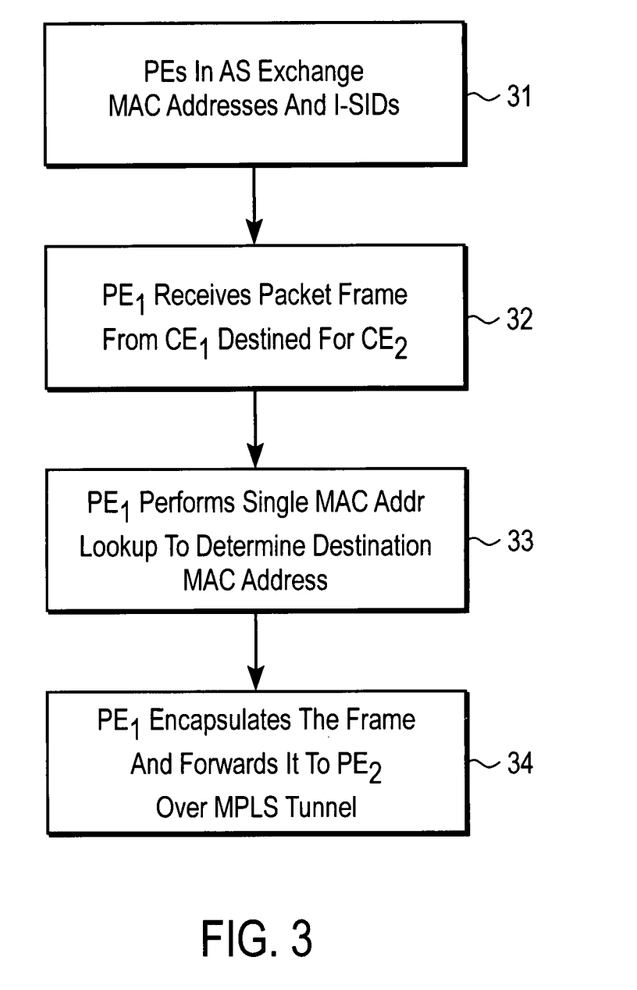
FIG. 3 illustrates an example method of operation for the network of FIG. 1.

In an intra-AS topology such as that shown in the example of FIG. 1, each PE device may be configured to distribute B-MAC addresses in the control plane, and forward frames in the data plane, according to the example method shown in FIG. 3. The process starts the process of FIG. 3 starts with the learning phase, wherein each of the PE devices in the autonomous system exchange B-MAC addresses and I-SIDs (block 31) along with their next hop BGP IP addresses. The learning process occurs in the control plane via the BGP protocol. In other words, each PE learns via BGP which B-MAC addresses sit behind which PE devices. More specifically, each of the PE devices exchange routing information via BGP messages sent/received from the various other PE devices in the AS. Routes learned via BGP have associated properties that are used to determine the best route to a destination device.

Once the PE devices have finished exchanging routing information, the learning phase is complete. When a customer wants to send data (in the form of data packets) to a certain customer site (e.g., $CE_2$), the sender customer equipment or edge device (e.g., $CE_1$) transmits a packet frame, which is then received by the PE device (e.g., $PE_1$) of the core or backbone network. This is shown by block 32. For an unknown customer unicast frame, the frame gets encapsulated in an 802.1ah frame with a B-MAC multicast address as the destination address, which is then sent over an MPLS multipoint LSP.

On the receiving PE, the customer source MAC address gets associated with B-MAC SA (e.g., customer MAC learning is performed in the data-plane even though provider B-MAC learning is performed in control plane). In contrast, for a known customer unicast frame, the frame gets encapsulated in an 802.1ah frame with the corresponding destination B-MAC address, which then, in turn, gets encapsulated in an MPLS frame with the BGP next hop corresponding to that of the PE associated with the destination B-MAC address. The receiving PE device forwards the packet to the egress line card based on either MPLS label or destination B-MAC address.

At the egress line card of the receiving PE, the MPLS and B-MAC headers are de-capsulated and the packet is forwarded based on customer destination MAC address (block 33). Furthermore, at the egress line card of the receiving PE, the customer source MAC address is learned and is associated with the source B-MAC address of the receiving frame. Because all of the B-MAC address learning has already been performed, the receiving provider edge device already knows which BGP next hop address to use for a given B-MAC address and no data-plane learning is required for B-MAC addresses.

Note that the source provider edge device (e.g. $PE_1$) first encapsulates the frame and then forwards the encapsulated frame to the destination provider edge device (e.g. $PE_2$) via an ordinary MPLS tunnel associated with the BGP next hop of $PE_1$ (which is $PE_2$). This is shown in block 34. Thereafter, the receiving PE device may forward the frame to the destination customer site (e.g. $CE_2$).

Figure 4:
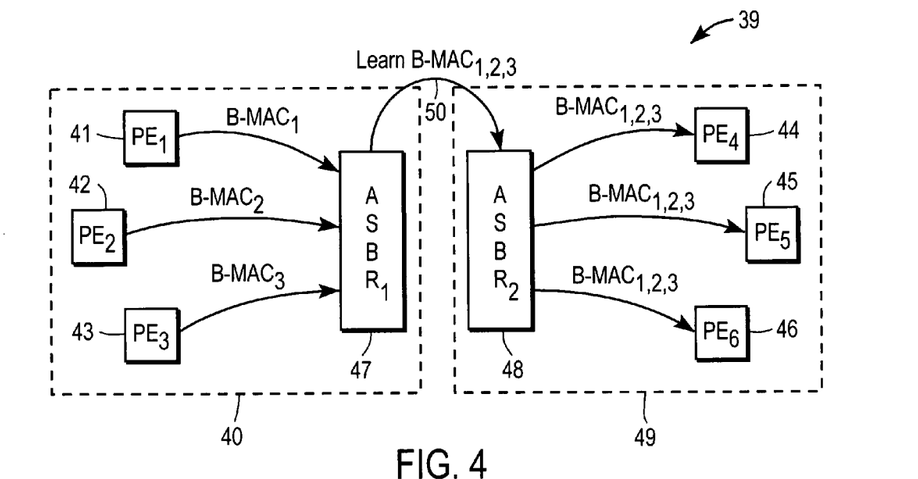
FIG. 4 illustrates an example network with inter-autonomous system learning.

FIG. 4 illustrates an example network 39 with inter-autonomous system learning between AS 40 and AS 49. In this example, AS 40 comprises PE devices 41-43 (labeled $PE_1$-$PE_3$) and ASBR 47 ($ASBR_1$). Similarly, AS 40 comprises PE devices 44-46 (labeled $PE_4$-$PE_6$) and ASBR 48 ($ASBR_2$). Learning is shown occurring from left to right the figure; that is, each of the PE devices 41-43 use I-BGP to send or advertise their associated B-MAC addresses to ASBR 47. However, it is appreciated that exchange of information occurs in both directions. In other words, although FIG. 4 shows information transfer occurring from left to right, routing information transfer or exchange also occurs in the opposite direction as part of the learning process.

Learning occurs between AS 40 & AS 49 when ASBR 47 sends or advertises the B-MAC addresses of PE devices 41-43 to ASBR 48. This is shown in the Figure by arrow 50 with the associated notation "Learn B-$MAC_{1-3}$". E-BGP is utilized for exchange of B-MAC addresses and I-SID information between ASBRs 47 & 48. ASBR 48 then sends or distributes this routing information to each of the PE devices 44-46. Although not shown explicitly, PE devices 44-46 also send their B-MAC addresses and I-SIDs to ASBR 48, which then sends this information to ASBR 47. Once received by ASBR 47, this routing information (e.g., B-MAC$_{4-6}$) may be distributed to each of PE devices 41-43. Practitioners in the art will appreciate that according to this approach learning is a mathematical function of the sum of the number of provider edge devices in the two autonomous systems.

Once learning has been completed, forwarding involves the process of looking up the B-MAC address of the destination in the stored forwarding tables.

Figure 5:
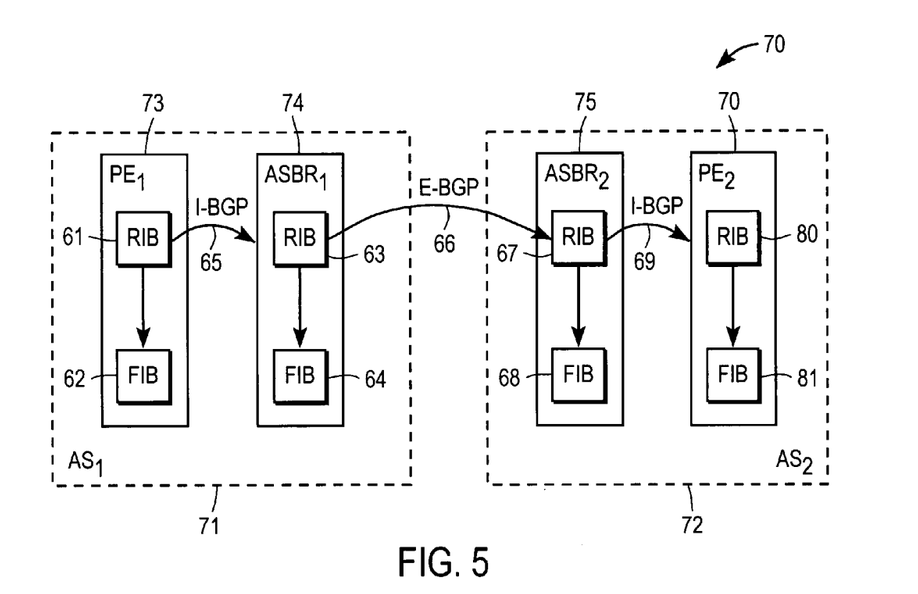
FIG. 5 illustrates an example network that shows population of routing information bases in an inter-autonomous system.

FIG. 5 illustrates an example network 70 that shows population of routing information bases (RIBs) for an inter-autonomous system. FIG. 5 shows AS 71 comprising ASBR 74 and PE device 73, with RIBs and forwarding information bases (FIBs) 63 & 64, and 61 & 62, respectively. On the right-hand side, AS 72 is shown comprising ASBR 75 and PE device 76 having RIBs and FIBs 67 & 68, and 80 & 81, respectively.

Each RIB consists of a table of entries that identify a destination, the subnetwork over which packets should be forwarded to reach that destination (also known as the next hop), and some form of routing metric. The information contained in the RIB is used to compute the actual routes ("next hops"), which are stored in the FIB of the respective device. The FIB therefore contains all the routes that could potentially be advertised to all neighboring routers within the next set of announcements. These routes are also the same set of routes used to forward IP datagrams.

Within each autonomous system, routing information is advertised or sent between devices during control plane learning using I-BGP. For instance, in AS 71, RIB 61 of PE device 73 is shown (by arrow 65) populating RIB 63 of ASBR 74 with its B-MAC and I-SID information. ASBR 74, in turn, sends this routing information to ASBR 75 using E-BGP (as shown by arrow 66), where it populates RIB 67. ASBR 75 than distributes this routing information to PE device 76 (as shown by arrow 69). PE device 76 stores the received routing information in RIB 80. It is appreciated that exchange of routing information also occurs in the opposite direction; that is, from PE device 76 to ASBR 75 (via I-BGP), then from ASBR 75 to ASBR 74 (via E-BGP), and then from ASBR 74 to PE device 73 (via I-BGP).

Figure 6:
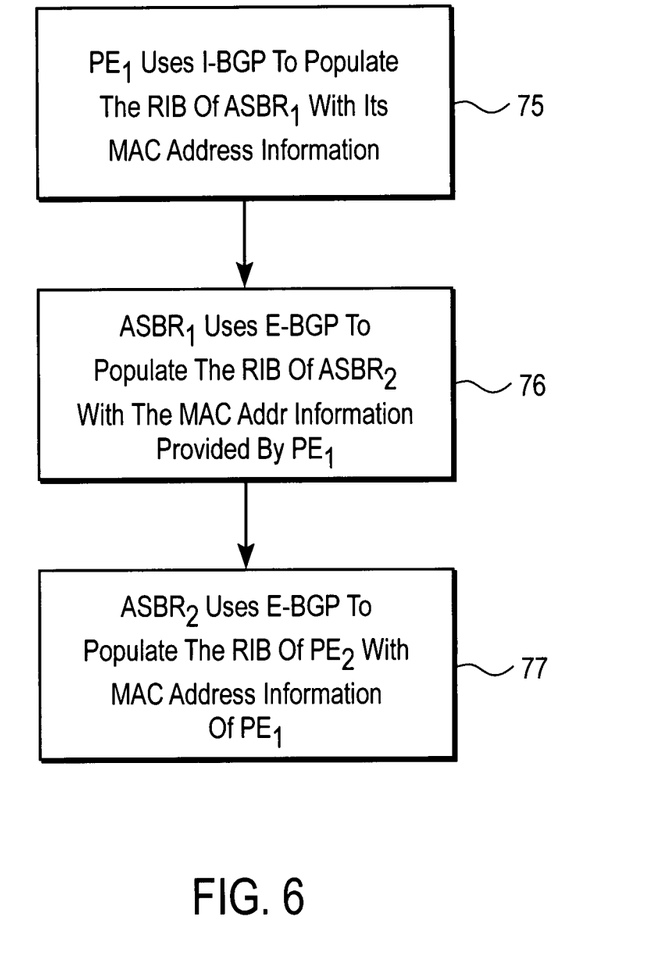
FIG. 6 illustrates an example method of operation for the system of FIG. 5.

Each of the above steps is shown in FIG. 6, which illustrates an example method of operation for the system of FIG. 5. At block 75, a first PE device (PE$_1$) uses I-BGP to populate the RIB of its associated ASBR (ASBR$_1$) with its B-MAC address and I-SID information. Next, ASBR$_1$ uses E-BGP to populate the RIB of the ASBR of the other autonomous system (e.g., ASBR$_2$) with the MAC address and I-SID information of PE$_1$. This is shown in FIG. 6 by block 76.

In one embodiment, the extended community attribute of E-BGP is utilized to pass the routing information from one ASBR to another ASBR. The BGP community attribute is an optional transitive attribute of variable length. The attribute consists of a set of four octet values that specify a community. The community attribute values are encoded with an AS number in the first two octets, with the remaining two octets defined by the AS. A prefix can have more than one community attribute. A BGP speaker that sees multiple community attributes in a prefix can act based on one, some or all the attributes. A router has the option to add or modify a community attribute before the router passes the attribute on to other peers.

Once its RIB has been populated with routing information provided by ASBR$_1$, ASBR$_2$ uses I-BGP to populate the RIB of the destination PE device (PE$_2$) with the MAC address and I-SID information of PE$_1$. This final step is shown by block 77.

To reiterate, B-MAC address redistribution across ASes works as follows. I-BGP and E-BGP instances share the same B-MAC RIB. Any updates to the RIB table by the I-BGP instance are reflected onto the E-BGP instance using a B-MAC redistribution API. The extended community attribute of BGP may be used to pass B-MAC updates (add/delete) from one ASBR into another ASBR (between autonomous systems), or from one ASBR into a PE device within the same AS. E-BGP further installs the routes in the B-MAC RIB through which the route is redistributed via I-BGP in another AS.

Figure 7:
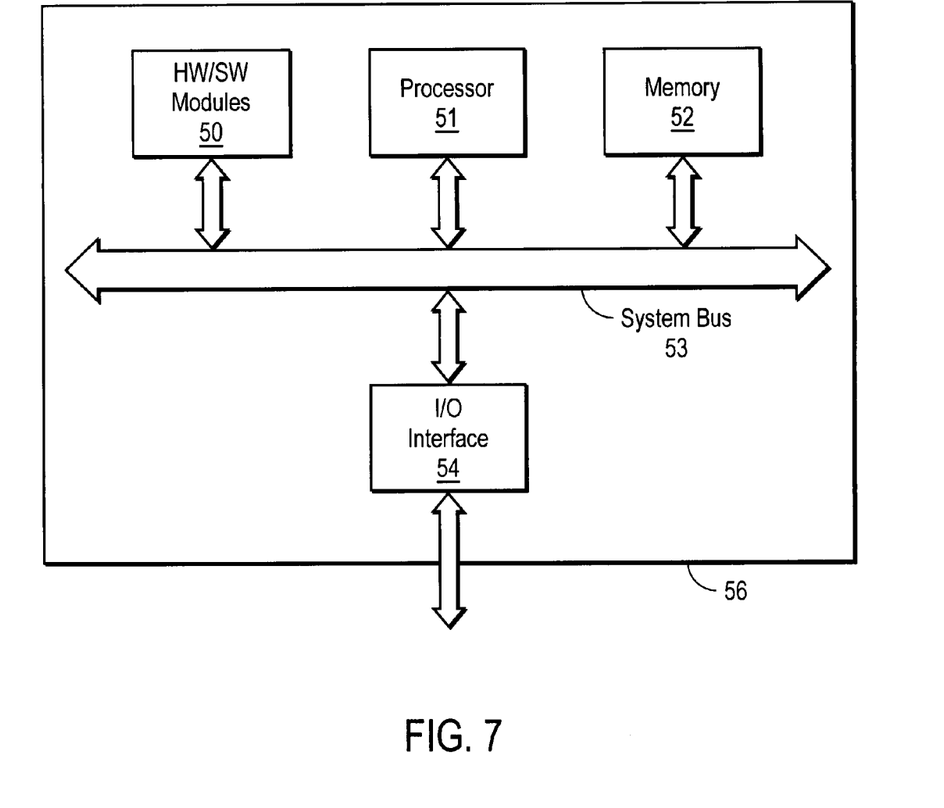
FIG. 7 illustrates an example network device or node.

FIG. 7 illustrates an example network device or node 50 which typically comprises a number of basic subsystems including a processor subsystem 51, a main memory 52 and an input/output (I/O) subsystem 55. Data is transferred between main memory ("system memory") 52 and processor subsystem 51 over a memory bus 53, and between the processor and I/O subsystems over a system bus 56. Examples of the system bus may include the conventional lightning data transport (or hyper transport) bus and the conventional peripheral component [computer] interconnect (PCI) bus. Node 50 may also comprise other hardware units/modules 54 coupled to system bus 56 for performing additional functions. Processor subsystem 51 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
   learning, by a first provider edge (PE) device of an autonomous system (AS), media access control (MAC) addresses of a plurality of other PE devices of the AS, the learning being performed as a control plane function with the MAC addresses being stored in a table, the control plane function being performed via Bridge Gateway Protocol (BGP); and receiving, by the first PE device from a first customer edge (CE) device, a packet data unit (PDU) encapsulated in a first frame, the first frame including a first MAC destination address associated with a second CE device;

encapsulating, by the first PE device, the first frame in a second frame, the second frame including a second MAC destination address associated with a second PE device;

performing a lookup, by the first PE device, in the table to determine a port associated with the second MAC destination address; and forwarding the PDU, by the first PE device, to one of the other PE devices over a Multi-Protocol Label Switching (MPLS) tunnel connected to the port without using a pseudowire.

2. The method of claim 1 wherein the first frame further includes a service instance identifier (I-SID).

3. The method of claim 1 wherein the PDU is received from the first customer edge (CE) device and the first CE device is connected to the PE device.

4. The method of claim 1 wherein the first frame further includes a first MAC source address associated with a second CE device, the method further comprising associating, in the table, the first MAC source address with a second MAC source address associated with the first PE device.

5. The method of claim 1 wherein forwarding the PDU to one of the other PE devices over a MPLS tunnel includes forwarding the PDU to the second PE device based on the second MAC destination address.

6. A method comprising:

receiving, by a first autonomous system border router (ASBR) of a first autonomous system (AS), a first plurality of provider-provisioned media access control (B-MAC) addresses via Interior Border Gateway Protocol (I-BGP), each of first plurality of B-MAC addresses being associated with a provider edge (PE) device of the first AS, the first plurality of B-MAC addresses being sent to each PE device of the first AS during control plane learning with the first plurality of B-MAC addresses being stored in a table at each PE device of the first AS;

sending, by the first ASBR, the first plurality of B-MAC addresses to a second ASBR of a second AS using Exterior Border Gateway Protocol (E-BGP);

receiving, by the first ASBR, a second plurality of B-MAC addresses each of which is associated with a PE device of the second AS, the second plurality of B-MAC addresses being received from the second ASBR via E-BGP, the second plurality of B-MAC addresses being sent to each PE device of the second AS during control plane learning with the second plurality of B-MAC addresses being stored in a table at each PE device of the second AS; and distributing, by the first ASBR, the second plurality of B-MAC addresses to each of the PE devices of the first AS using I-BGP.

7. The method of claim 6 wherein the first ASBR and the second ASBR each have a routing information base (RIB), the sending of the first plurality of B-MAC addresses populating the RIB of the second ASBR, and the receiving of the second plurality of B-MAC addresses populating the RIB of the first ASBR.

8. The method of claim 7 further comprising updating the RIB of the first ASBR using I-BGP to reflect new B-MAC address information of the first AS.

9. The method of claim 5 wherein the first plurality of B-MAC addresses is received by the first ASBR over a Multi-Protocol Label Switching (MPLS) network.

10. The method of claim 7 wherein the first plurality of B-MAC addresses is received over a Multi-Protocol Label Switching (MPLS) network.

11. The method of claim 8 further comprising updating the RIB of the second ASBR using E-BGP to reflect the new B-MAC address information of the first AS.

12. An apparatus comprising:
one or more processors; and
a memory comprising one or more instructions executable at the processors, the one or more processors configured to execute the instructions, to:
    exchange media access control (MAC) address information with provider edge (PE) devices in an autonomous system (AS) as a control plane function using Border Gateway Protocol (BGP) with the MAC address information being stored in a table; and
    receive, from a first customer edge (CE) device, a packet data unit (PDU) encapsulated in a first frame, the first frame including a first MAC destination address associated with a second CE device;
    encapsulate the first frame in a second frame, the second frame including a second MAC destination address associated with a PE device connected to the second CE device; and
    forward the PDU to one of the PE devices via a Multi-Protocol Label Switching (MPLS) tunnel without using a pseudowire.

13. The apparatus of claim 12 wherein the one or more processors is further configured, when executing the instructions, to perform a lookup in a table using a destination address of the frame, the lookup resulting in a port that connects with the one of the other PE devices via the MPLS tunnel.

14. The apparatus of claim 12 wherein the frame includes a service instance identifier (I-SID).

15. The apparatus of claim 12 wherein the first frame further includes a first MAC source address associated with a second CE device, and wherein the one or more processors is further configured, when executing the instructions, to associate, in the table, the first MAC source address with a second MAC source address associated with the first PE device.

16. The apparatus of claim 12 wherein forwarding the PDU to one of the other PE devices over a MPLS tunnel includes forwarding the PDU to the second PE device based on the second MAC destination address.

17. An apparatus comprising:
one or more processors; and
a memory comprising one or more instructions executable at the processors, the one or more processors configured to execute the instructions, to:
    share, via Interior Border Gateway Protocol (I-BGP), a first routing information base (RIB) with a first plurality of provider edge (PE) devices of a first autonomous system (AS);
    share, via Exterior Border Gateway Protocol (E-BGP), provider-provisioned media access control (B-MAC) addresses contained in the first RIB with an autonomous system border router (ASBR) associated with a second AS that includes a second plurality of PE devices with the B-MAC addresses being stored in a table at each PE device; and pass B-MAC updates from the first AS to the ASBR of the second AS using an extended community attribute of BGP.

18. The apparatus of claim 17 wherein the one or more processors are further configured, when executing the instructions, to receive a second RIB of the ASBR via E-BGP.

19. The apparatus of claim 18 wherein the first and second RIBs each contain provider-provisioned media access control (B-MAC) addresses.

20. The apparatus of claim 19 wherein the one or more processors are further configured, when executing the instructions, to receive B-MAC updates from the ASBR of the second AS using an extended community attribute of BGP.

* * * * *